United States Patent [19]

Wadensten

[11] 4,425,813

[45] Jan. 17, 1984

[54] VIBRATION DAMPENING APPARATUS FOR MOTOR ACTUATED ECCENTRIC FORCES

[76] Inventor: Theodore S. Wadensten, P.O. Box 8 Stilson Rd., Wyoming, R.I. 02898

[21] Appl. No.: 270,647

[22] Filed: Jun. 4, 1981

[51] Int. Cl.³ .................. F16H 33/10; B06B 1/16; F16D 3/68
[52] U.S. Cl. ..................................... 74/87; 248/635; 248/638; 310/51; 310/91; 366/128; 464/71
[58] Field of Search .................. 74/87; 209/366.5; 248/603, 635, 638; 310/51, 91; 404/113, 114, 115, 116, 117; 366/128; 464/71

[56] References Cited

U.S. PATENT DOCUMENTS

| | | | |
|---|---|---|---|
| 2,188,807 | 1/1940 | Castricone | 310/51 |
| 2,400,341 | 5/1946 | Day et al. | 404/113 |
| 2,829,529 | 4/1958 | Fleming | 366/128 X |
| 3,177,731 | 4/1965 | Peterson | 74/87 |
| 3,510,137 | 5/1970 | Freier | 248/638 X |

*Primary Examiner*—Allan D. Herrmann
*Attorney, Agent, or Firm*—Ralph R. Roberts

[57] ABSTRACT

This invention pertains to induced vibrations and the dampening of these vibrations in the motor means. Vibrations induced by rotating a shaft having eccentric weights thereon have been used to produce all kinds of shaking apparatus including large car shakers in which the induced force may be much as eight thousand two hundred pounds. These vibrations may be as much as five thousand six hundred vibrations per minute and may be employed in hugh bins and hoppers in which the capacity is as great as one hundred fifty thousand pounds. Vibrators using air, electric or hydraulic motors can be tuned or adjusted to provide the desired results. Most of these vibrators using a tuned motor may be temporarily or permanently attached. Conventional motor driven vibrators, as far as is known, transmit the vibrational forces into the shaft of the motor. Said motors, which are usually conventional off-the-shelf units have their rotor bearings designed for rotary motion rather than combined with a vibratory force. This vibratory force reduces the life expectancy of these motors bearings. A rubber dampener device is used between the motor output shaft and the eccentric shaft which eliminates all vibration and vibrational forces from the housing of the vibration producing apparatus. The produced forces are absorbed from transmittal to the housing of the motor by two ring-like arrays of rubber grommets and spaced discs specifically adapted to prevent transmission of vibrations to the motor housing.

12 Claims, 3 Drawing Figures

VIBRATION DAMPENING APPARATUS FOR MOTOR ACTUATED ECCENTRIC FORCES

CROSS REFERENCE TO RELATED APPLICATIONS

This application includes subject matter pertaining to the application Ser. No. 196,310 as filed Oct. 14, 1980. The vibration dampening apparatus hereinafter described represents an improved assembly which is used with both electric and hydraulic motors. This assembly provides an economy of member parts and ease of repair and assembly.

BACKGROUND OF THE INVENTION

1. Field of the Invention

With respect to the classification of art as established in and by the U.S. Patent Office the present invention is believed to be in the general class entitled, "Machine Elements and Mechanisms" (Class 74) and in the subclass entitled, "Mechanical Movements—unbalanced weights" (Subclass 87) and "With Vibratory Dampening Means" (Subclass 574).

2. Description of the Prior Art

The prior art having vibration dampening devices are well established and vibration produced by eccentric weights is also very well known. In the present invention it is contemplated that the vibration equipment be carried either by a housing that is clamped or attached for a short period of time or a semi-permanent condition to a car shaker, screen or the like. It is to be noted in particular that motor means are known in which the vibrations are produced by one or more eccentric weights driven by a motor. Usually the motor actuating the vibration is adjustable in speed and is usually an "off-the-counter" type of equipment that is easily replaced by the customer. Conventionally these motors have bearings that carry the rotor and are adapted for standard rotation of the motor. Said conventional bearings are not designed to accept the constant eccentric force and vibrations when transferred to a rotor. If the vibration is delivered to said motor rotor it is also transferred to the bearing means in the motor housing which often has a deleterious effect on the bearings and then to the stator of the motor.

In the present invention the vibration force carried by a shaft is isolated from the motor rotor by a rubber-type coupling or shock mount. The motor housing is also carried by a shock absorbing mount so that any vibratory force by the rotating eccentric weight is not transferred to the motor housing. In this manner the induced vibration forces from the eccentric weight are not transferred to the motor either to the rotor shaft or the motor housing. The result is that motors operating with the bearings that carry the rotor are not unduly stressed. The life of the bearings in the motor are substantially that of a motor as in use in conventional service.

SUMMARY OF THE INVENTION

This invention may be summarized, at least in part, with reference to its object. It is an object of this invention to provide, and it does provide, an eccentric weight carried by a housing which may be temporarily or permanently attached to apparatus that is to be vibrated. The eccentric forces developed in said shaft are not transmitted to the motor because of a shock absorbing coupling device which eliminates the transfer of vibration from the eccentric shaft to the motor rotor. Additionally, there is provided in a connection from the housing of the vibration device to the housing of the motor, a shock absorbing and vibration dampening means which prevents or substantially eliminates any transmission of the vibration forces from the eccentric weight vibration housing to the motor housing.

Essentially, the present invention provides a vibration force which is carried on a shaft in a housing. This force is revolved by a connected motor and the rotor is connected to said shaft by a rubber shock coupling which coupling may be commercial or may be a special coupling. Such a shaft coupling is used in the apparatus of the several embodiments shown. The shaft carrying this rotor is carried by anti-friction bearings and is connected to the shaft of the vibrator by resilient coupling means. The outer housing of the motor which carries the rotor on bearings within and by said housing is attached to the housing, retaining and containing the eccentric vibratory weight means. This resilient shock absorbing device dampens and substantially eliminates the transfer of vibrations through the housing. The combination of said vibration absorbing or dampening means eliminates any transfer of vibration forces through the shaft of the housing to the motor drive unit.

The embodiment represents a vibratory unit in which the vibrations are developed by eccentric weights carried on a shaft and on bearings within the housing. This housing may be secured by "clamp-on" means or may be permanently mounted for use in moving or shaking loose the loads such as those in a hopper or chute. The drive may develop as little as three thousand frequencies per minute and may be provide forces as little as six to seven hundred pounds and as great as almost nine thousand pounds of force.

In addition to the above summary the following disclosure is detailed to insure adequacy and aid in understanding of the invention. This disclosure, however, is not intended to cover each new inventive concept no matter how it may later be disguised by variations in form or additions of further improvements. For this reason there has been chosen a vibration apparatus attachable to a pneumatic motor and a fragmentary view showing this same apparatus attachable to a hydraulic motor. This showing of the specific embodiments of the vibration dampening apparatus as adapted for use with motor actuated eccentric forces shows a preferred means for constructing and assembling said motor actuated units. These specific embodiments have been chosen for the purpose of illustration and description as shown in the accompanying drawings wherein:

BRIEF DESCRIPTION OF THE DRAWINGS

In the following description and in the claims various details are identified by specific names for convenience. These names are intended to be generic in their application. Corresponding reference characters refer to like members throughout the several figures of the drawings.

The drawings accompanying, and forming part of, this specification disclose details of construction for the purpose of explanation but structural details may be modified without departure from the concept and principles of the invention and the invention may be incorporated in other structural forms than shown.

EMBODIMENT OF THE VIBRATION APPARATUS OF FIG. 1

Figure 1:
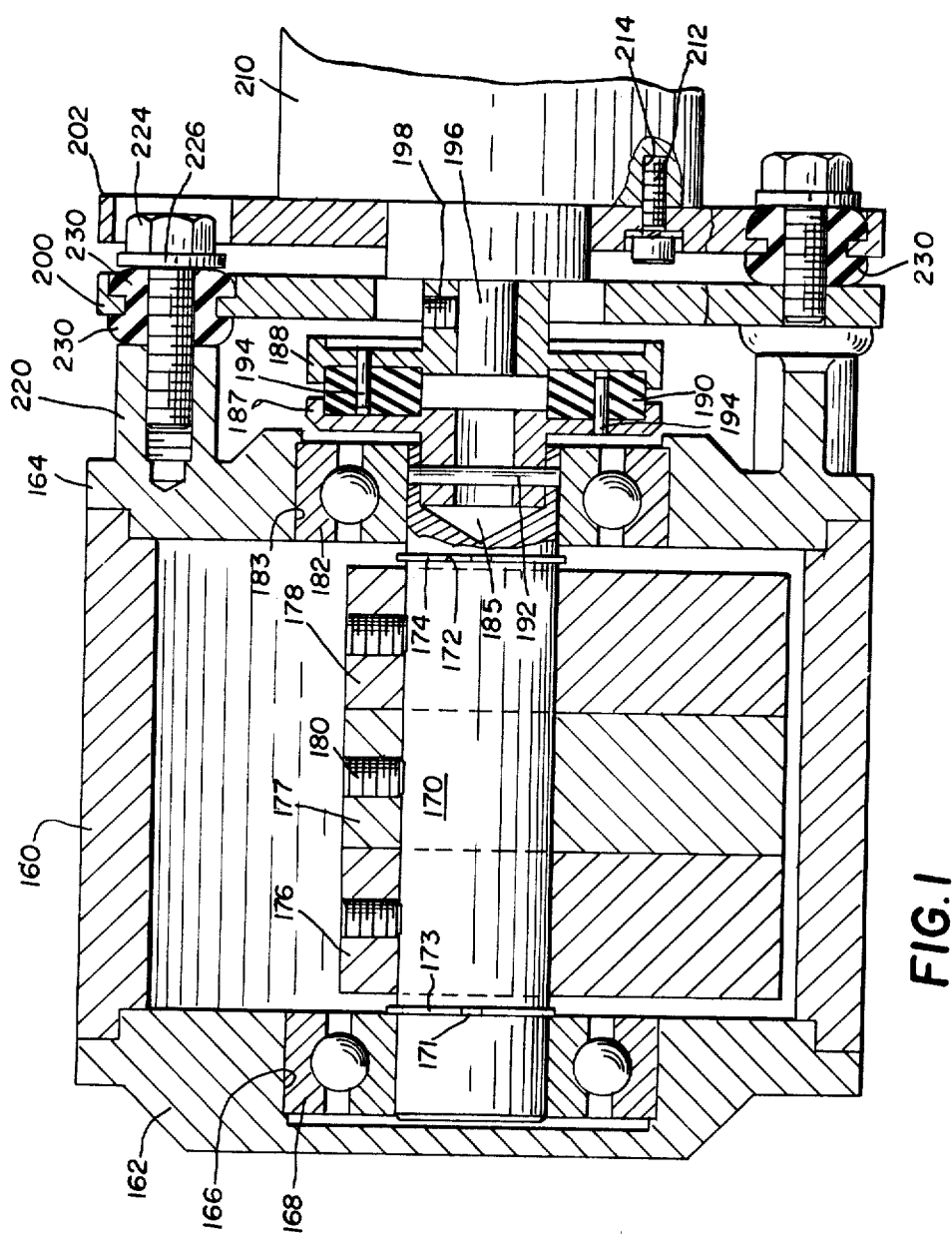
FIG. 1 represents a sectional side view, partly diagrammatic, and showing a vibratory means carried in a housing with the vibrational forces produced by three eccentric weights carried on a shaft, said shaft rotationally driven through a resilient coupling from an output shaft of a pneumatic motor and with said motor housing attached to said apparatus housing through a motor mount disk and rubber bushings then to an isolator disk and then through another array of rubber bushings to an end housing of and for the vibration apparatus.

FIG. 1 shows a vibration apparatus which includes a housing 160 which is bored to provide a seating surface for an end member 162 and a front housing 164. End member 162 also has a bored recess 166 in which is mounted an anti-friction bearing 168. A shaft 170 has shallow and narrow grooves 171 and 172 formed therein for mounting of a snap ring 173 and 174. Within the bore of housing 160 are carried eccentric weights 176, 177 and 178 secured to and mounted on shaft 170. These eccentric weights are retained as by set screws 180 or other pin means so that they are fixed to shaft 170 and are rotated therewith. The right or front end of shaft 170 is carried by an anti-friction bearing 182 carried in a shoulder bore 183 formed in front housing 164.

As depicted, the right or front end of shaft 170 is made with a precise bore 185 which is formed and sized to receive the outer diameter of a flexible coupling half 187. A like half 188 and a center disk 190 are conventionally used. Coupling half 187 is secured to shaft 170 by means of a pin 192 which secures said coupling half 187 within the bore 185. A resilient center disk 190 is driven by half 188 by means of a plurality of drive pins 194. The half 188 is secured to a motor output shaft 196 by means of a set screw 198. One half of the plurality of drive pins 194 are mounted and secured in coupling half 187 and extend toward coupling half 188. These pins are disposed in alternate holes in the resilient disk 190 and said pins are of a length to extend nearly through the holes formed in disk 190. The other half of the plurality of said drive pins 194 are mounted and secured in coupling half 188 and extend toward coupling half 187. These pins are disposed to be mounted in alternate holes formed in the resilient disk 190 and are of a length to extend nearly through said positioned disk. This disk is conventionally of resilient rubber or rubber-like material and with the coupling halves provide a vibration dampener similar to conventional flexible coupling dampers used for shaft coupling. Coupling half 187 as depicted is finished to provide a leftwardly extending portion that is a snug fit in bore 185 in shaft 170. This arrangement enables shortening of the overall length of the apparatus. Isolator disk 200 is spaced from the motor mount disk 202 by rubber grommets 230 to be hereinafter more fully described. Pneumatic motor 210 carries the motor mount disk 202 by means of cap screws 212 which pass into threaded holes 214 in the housing of motor 210. The arrangement and isolation of forces in the housing is shown and explained in FIG. 3.

ALTERNATE MOUNTING OF FIG. 2

Figure 2:
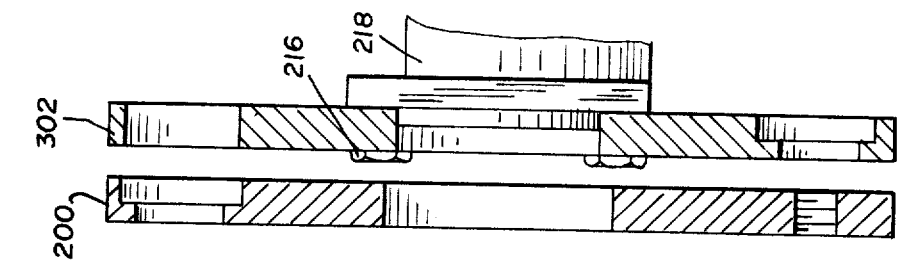
FIG. 2 represents a sectional side view and showing the motor mount disk and isolator disk arranged for use with a hydraulic motor.

FIG. 2 is a very fragmentary view in which the vibration apparatus of FIG. 1 is adapted for mounting to a hydraulic motor. As seen in FIG. 2 the isolator disk 200 is like FIG. 1 and the motor mount disk now identified as 302 is very similar to 202 but has a smaller diameter cutout and different bolt hole arrangements for hex cap screws 216 that enter and engage threaded holes (not shown) in a hydraulic motor 218.

MOTOR HOUSING ISOLATION MEANS AS IN FIG. 3

Figure 3:
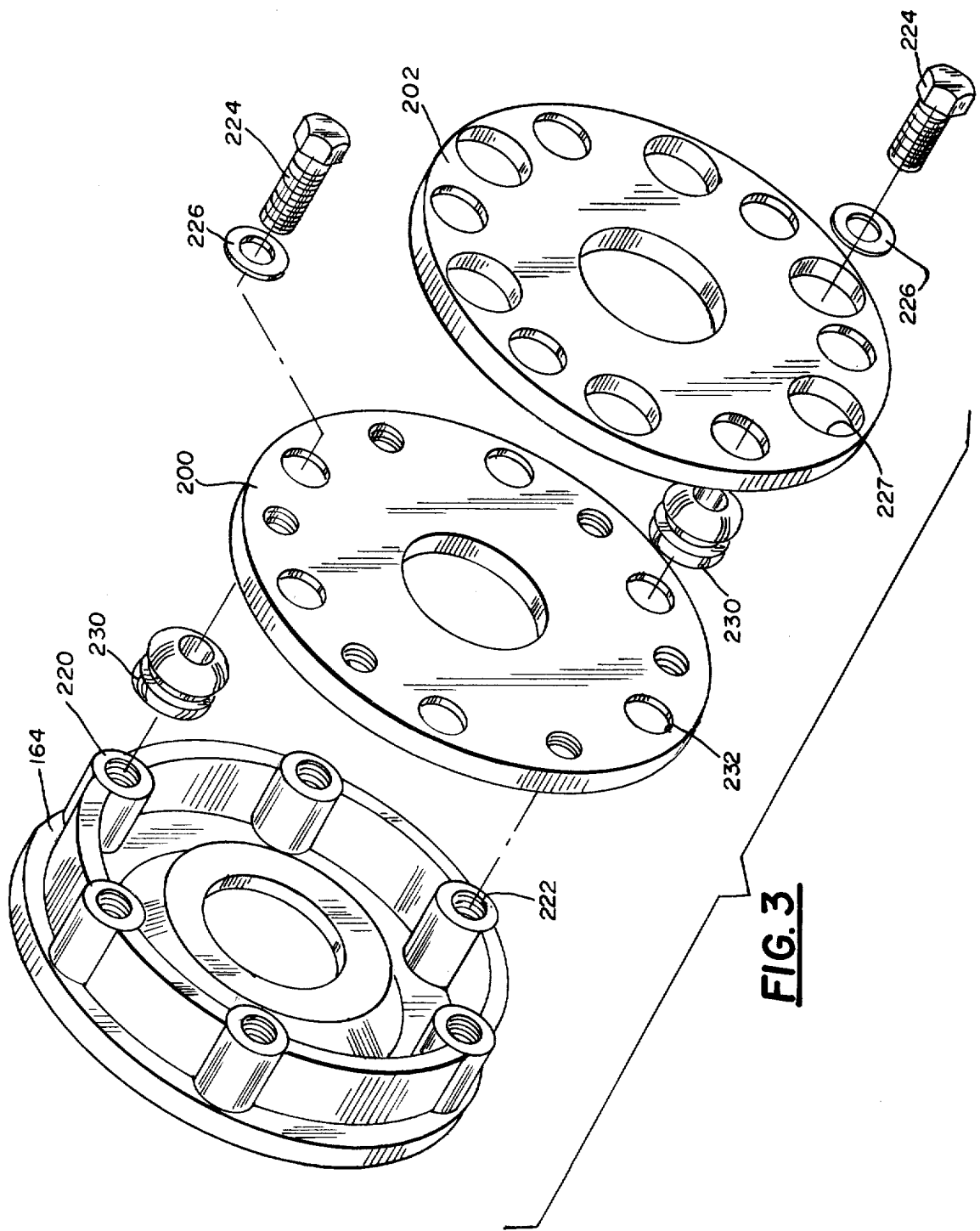
FIG. 3 represents an expanded isometric view, partly diagrammatic and showing the end housing, rubber bushings, motor mount disk and threaded fastening means for making an assembly that may be disassembled if repairs or inspection are required.

Referring next and finally to FIG. 3, it is noted that in the front housing 164 is exemplified as having six protruding bosses 220 in which are formed tapped holes 222 for a cap screw. This front housing 164 has six molded bosses each of which is faced and then drilled and tapped to provide a threaded hole 222 for a cap screw 224. A washer 226 is placed underneath the head of cap screw 224 so as to enable turning of the cap screw without undue influence so that the cap screw may be rotated without turning rubber grommet 230. These rubber grommets are shown almost full size and have a molded recess midway of their length enabling each grommet to be mounted in a counterbored and shouldered hole 232 and retained by an isolator 200 as seen in FIG. 3. The grommets 230 have the reduced central diameter portion snapped into the reduced diameter hole 232 so that each grommet is retained.

The motor mounting disk 202 is shown with six counter bored holes for the grommets 230. As few as three grommets may be used as long as the spacing between disks is maintained. The same comment applies to the mounting of grommets in disk 200. In FIG. 2 the hex head cap screws 216 are shown as very short so as to provide the desired assembly capability without interference or contact of these bolts with disk 200. Coupling half 187 is assembled to shaft 170 before the bearing 182 is placed thereover. The grommets 230 are mounted in both disks before securing the bolts into front housing 164 and disk 200. The number of eccentric weights 176, 177 and 178 are a matter of choice and the vibrations induced thereby are a matter of intended use.

The vibration isolation apparatus as shown in FIGS. 1, 2 and 3 employs two rows of grommets 230 and two plates or disks spaced from each other by said resilient grommets. One disk 202 is secured to the motor means housing and one disk 200 is secured to the vibration housing 160. The rubber or resilient grommets 230 isolate any vibrations from the housing 160 to the motor housing.

The securing of frame 160 to the apparatus to be vibrated is merely a matter of selection. The securing of the end member 162 and front housing 164 may be by through bolts or other means that is satisfactory for the use intended and is therefore a matter of designers choice.

USE AND OPERATION OF EMBODIMENT OF FIGS. 1, 2 AND 3

The shaft 170 and eccentric weights 176, 177 and 178 are assembled to provide the desired eccentric force. Bearings 168 and 182 are selected to accommodate the severe vibration load produced with the revolution of the shaft carrying the eccentric weights. The coupling employs a resilient center disk 190 and may be any of the commercial types of units available. It is only necessary that any and all vibrations be isolated from the motor shaft so that the bearings carrying the rotor not be overloaded. It is also necessary that these same vibratory forces or influences not be transmitted to the motor housing hence rubber grommets 230 are provided. These grommets 230 prevent transfer of vibrations to the motor housing.

In the above examples shown the vibration forces are developed by rotating a shaft. These vibratory forces are produced by an eccentric weight carried on said shaft. The shaft within the vibration housing is carried by bearings that have the desired capability of accepting the loads of the eccentric weights on the turned shaft. The transfer of these vibratory forces to the motor providing the turning force is avoided by utilizing a coupling which has a resilient member portion that isolates the vibrations in and along said shaft. At the same time it is desirable that the vibration forces not be transmitted to the motor housing. Two rows of resilient grommets are used to retain the motor housing and the vibratory housing in alignment and position. The above embodiment provides resilient coupling means so that any vibrations in the eccentric weight housing are prevented from transmittal to the motor housing. By preventing undue vibratory forces from being transmitted to the motor the life of the bearings and of the motor itself is nearly normal. The above embodiments provide such a means for isolating the vibratory forces from reaching and adversely affecting the motor use and life.

The embodiment shows the disks 200, 202 and 302 with counterbored holes to accept and retain the grommets 230. These disks could have U-shaped or stirrup-type openings disposed to receive said grommets without a closed counterbored hole. The counterbore is not needed except when and where the threaded screws are used. Nuts and washers might be used as an alternative. The opening for the shaft coupling is made as a round configuration but this is not to preclude other shapes. The essence of this embodiment is the use of two resiliently disposed disk members and two rows of rubber or rubber-like grommets to provide isolation of the vibrations from the frame of the motor.

The disks 202 and 302 have clearance holes 227 for the entrance and tightening of cap screws 224 against the washers 226. These holes 227 may be only as large as the washer 226 since cap screw 224 may be a socket head fastening device as may screws 212 and 216. Alternate but commercial fastening means may be employed.

In the above description the snap rings 173 and 174 secured in the grooves in the shaft 170 are spaced so as to allow a little play or space between the inner races of the bearings 168 and 182. These snap rings are disposed to engage the bearings to prevent undue movement of the shaft longitudinally but because of heat, manufacturing tolerances and the like, the snap rings are placed with about one-sixteenth of an inch clearance. Also to be noted is the securing of the housing portions 162, 160 and 164 to one another. Wings and bolts may be used or other conventionally known means may be provided. The securing of the vibration device to the apparatus to be vibrated is usually by known means. The construction and method of securing the apparatus is a matter of choice for the particular application of the apparatus.

Although described as grommets, the vibration dampeners shown and described in connection with FIGS. 1 through 3 may also be made as rubber washers. The washers or isolators may each be washers with shouldered portions that engage the holes in the disks 200, 202 and 302 or may be a washer and a shouldered washer or may be resilient washers with or without a resilient washer mounted in the aperture of the disk so as to isolate the shank of the cap screw from the disk and to provide the desired spacing. Rubber washers or rubber-like washers having a given thickness and an inside diameter adapted to slide on the shank of the cap screw with their outer diameter larger than the through aperture may be used. One washer is disposed on each side of a disk 200, 203 or 302. When the cap screw is tightened into position the washer displaces or "cold flows" sufficiently for the washers on each side of the disk to partially enter the aperture to assume a retained condition. The washers or isolators dampen the vibrations and prevent the transmittal thereof to the frame of the motor. Whatever the arrangement the grommets or resilient washers are disposed to provide isolation through two rows of isolators.

Terms such as "left," "right," "up," "down," "top," "front," "back," "in," "out" and the like are applicable to the embodiment shown and described in conjunction with the drawings. These terms are merely for the purpose of description and do not necessarily apply to the position in which the vibration dampening apparatus may be constructed or used.

While a particular embodiment of the vibration dampening apparatus has been shown and described it is to be understood the invention is not limited thereto since modifications may be made within the scope of the accompanying claims and protection is sought to the broadest extent the prior art allows.

What is claimed is:

1. A vibration dampening apparatus for rotating at least one eccentric weight carried on and by a shaft isolated from transmitting said vibrations to a motor rotating said shaft, the dampening apparatus including:
   (a) an independent housing within a cavity of which at least one eccentric weight is moved and rotated;
   (b) a support shaft rotatably carried within and by said independent housing;
   (c) at least one eccentric weight secured to said shaft and rotated as the support shaft is rotated;
   (d) at least one bearing means carrying said shaft and mountable in an end portion of the housing means, said housing means sized so as to accommodate the forces of vibration from the eccentric weight to said shaft as the shaft is rotated;
   (e) a first coupling half mounted and secured to one end of said support shaft and having a plurality of spaced pin means secured thereto and therein, said pin means protruding from a surface substantially normal to the axis of said shaft, said pin means extending in a direction away from said eccentric weight;
   (f) a resilient central portion of the coupling and having means to slidably retain said pin means provided in the first coupling half, and in mounted condition on the pin means to be arranged substantially adjacent the first coupling half;
   (g) a second coupling half mounted on and secured to an output shaft of a motor, said second coupling half having a plurality of spaced pin means secured thereto and therein, said pin means protruding from a surface substantially parallel to the surface in the first coupling half, said pin means extending in a direction towards said first coupling half and disposed to enter additional means provided in said resilient central portion, the pin means in the first and second coupling halves intermeshed in retaining means in the central portion so as to transmit the torque from the motor to said coupling halves with the resilient central portion isolating the vibrations from the rotation of the eccentric weight and preventing transmittal of said vibrations to the motor shaft;

(h) said motor positioned adjacent to said independent housing and with vibrations from the rotation of the eccentric weight through and from the independent housing to a housing of the motor being isolated and dampened by a first plurality of resilient washer means carried in and by an isolation disk and said housing is secured through said first resilient washer means to the independent housing by securing means and with this isolation disk further isolated and dampened by another and second multiplicity of resilient washer means carried by a motor mount disk and with said motor mount disk secured to the isolation disk through said second resilient washer means by securing means, and (i) means for securing a frame of said motor to the motor mount disk.

2. Vibration dampening apparatus as in claim 1 in which the independent housing is formed with an open end which is closed by a front housing removably secured by fastening means and having protruding bosses against which are brought face portions of the first plurality of resilient washer means.

3. Vibration dampening apparatus as in claim 2 in which the independent housing is secured to the housing of the motor by and through cap screws engaging threaded holes in the protruding bosses at the front of the independent housing, each of said screws passing through said first resilient washer means carried in said isolation disk and other cap screws passing through each of said multiplicity of resilient washer means carried in the motor mount disk and into threaded holes in the isolation disk.

4. Vibration dampening apparatus as in claim 2 in which said resilient washer means includes rubber-like washers disposed on each side of said disks with the washers displaced partially into through apertures in said disks by the tightening of securing means and with said displacement preventing disorientation of said secured disk.

5. Vibration dampening apparatus as in claim 2 in which said resilient washer means are grommets of rubber or rubber-like material, said grommets mountable in apertures formed in said disks.

6. Vibration dampening apparatus as in claim 1 in which the independent housing includes a central bore in which are mounted the bearing means which are anti-friction bearings, said bearings retained in place by snap rings adapted to retain said bearings and the shaft and any eccentric weight thereon.

7. Vibration dampening apparatus as in claim 6 in which there are three eccentric weights which are mountable on said shaft.

8. Vibration dampening apparatus as in claim 1 in which the rotating shaft is carried by anti-friction bearings, each bearing seated and retained in a shouldered recess formed in a front and rear end member of the independent housing.

9. Vibration dampening apparatus as in claim 8 in which the shaft in the independent housing is retained in place between the anti-friction bearings by snap rings seated in grooves formed in said shaft.

10. Vibration dampening apparatus as in claim 1 in which the motor means is pneumatic and the speed is selectively variable.

11. Vibration dampening apparatus as in claim 1 in which the motor means is hydraulic and the speed is selectively variable.

12. Vibration dampening apparatus as in claim 1 in which the motor means is electric and the speed is selectively variable.

* * * * *